US012563540B2

(12) United States Patent
Alasti et al.

(10) Patent No.: US 12,563,540 B2
(45) Date of Patent: Feb. 24, 2026

(54) ALLOCATING RESOURCES AND PROVIDING ACCESS ON-DEMAND TO RESOURCES

(71) Applicant: DISH Wireless L.L.C., Littleton, CO (US)

(72) Inventors: Mehdi Alasti, Arlington, VA (US); Premchand Chandran, Ashburn, VA (US); Siddhartha Chenumolu, Ashburn, VA (US)

(73) Assignee: DISH Wireless L.L.C., Littleton, CO (US)

( * ) Notice: Subject to any disclaimer, the term of this patent is extended or adjusted under 35 U.S.C. 154(b) by 309 days.

(21) Appl. No.: 18/481,658

(22) Filed: Oct. 5, 2023

(65) Prior Publication Data

US 2025/0119885 A1     Apr. 10, 2025

(51) Int. Cl.
$\quad$ H04W 24/02 $\quad\quad$ (2009.01)
$\quad$ H04W 72/0453 $\quad$ (2023.01)
(52) U.S. Cl.
$\quad$ CPC ....... H04W 72/0453 (2013.01); H04W 24/02 (2013.01)
(58) Field of Classification Search
$\quad$ CPC ... H04W 4/24; H04W 24/02; H04W 72/0453; H04W 72/56
$\quad$ See application file for complete search history.

(56) References Cited

U.S. PATENT DOCUMENTS

2014/0331299 A1* 11/2014 Junod ..................... G06F 21/42
$\quad\quad\quad\quad\quad\quad\quad\quad\quad\quad\quad\quad\quad\quad\quad\quad\quad\quad\quad$ 726/7

* cited by examiner

*Primary Examiner* — Sam Bhattacharya
(74) *Attorney, Agent, or Firm* — Kilpatrick Townsend & Stockton LLP

(57) ABSTRACT

Systems, devices, and methods related to allocating cellular wireless network resources and providing access on-demand (AoD) to the cellular wireless network resources are provided. An example method includes: obtaining tenant information and historical tenant data of multiple tenants, predicting an anticipated/optimized demand of a resource of a cellular network for each tenant, determining aa anticipated/optimized unit price of the resource, providing the anticipated/optimized unit price to each tenant, receiving an actual demand from each tenant, determining that a deviation of the actual demand from the anticipated/optimized demand is of or below a predetermined threshold, allocating the resource to the tenants based on the actual demand received from each one of the plurality of tenants, and providing access to the allocated resource to one of the plurality of tenants for one or more user equipment (UE) connected to a tenant network of the tenant to use the allocated resource.

20 Claims, 10 Drawing Sheets

| Tenant Identity | Geographic Area | Band Assignment | Bandwidth Allocation | Total Bandwidth | QoS Attributes and Requirements |
|---|---|---|---|---|---|
| 502 | 504 | 506 | 508 | 510 | 512 |
| Enterprise 1 | Location 1 Location 2 | Band 1 Band 2 | BWP1-1 of Band 1 BWP2-1 of Band 2 | TBW 1 (BWP1-1 + BWP2-1) | Device Type: mobile Max Throughput: 1 Mbps Latency: less than 50 ms Coverage: Outdoor/high Reliability Handover Priority: Normal |
| Enterprise 2 | Location 1 Location 2 Location 3 | Band 1 Band 2 Band 3 | BWP1-2 of Band 1 BWP2-2 of Band 2 BWP3-1 of Band 3 | TBW 2 (BWP1-2+BWP2-2+BWP3-1) | Device Type: Autonomous Vehicles Max Throughput: 10 Mbps Guaranteed Latency: less than 10 ms Coverage: Extended Outdoor/High Reliability Handover Priority: High |
| Enterprise 3 | Location 1 | Band 1 | BWP1-3 of Band 1 | TBW 3 (BWP1-3) | Device Type: Internet-of-Things (IoT) Max Throughput: 1 Mbps Guaranteed Latency: less than 10 ms Coverage: Outdoor and Indoor/high Reliability |
| ... | ... | ... | ... | ... | ... |

Construct a supply-and-demand (S/D) model for an AoD provider to optimize allocation of bandwidth of a spectrum or a band associated with a radio unit sharable by a plurality of tenants for providing access to the spectrum or band to the plurality of tenants, the S/D model represented by a total value for each tenant and a total income function for the AoD provider    650

Obtain a Nash Equilibrium Status (NES) based on the S/D model, wherein at the NES, the total value of each tenant is of or above a predetermined value threshold, and the total income of the AoD provider is of or above a predetermined income threshold    652

Obtain an optimized unit price of bandwidth common to the plurality of tenants and a predicted/anticipated/ optimized demand for each one of the plurality of tenants at the NES    654

Allocate the bandwidth to the plurality of tenants according to the optimized demand for each tenant
656

Receive a request for access to bandwidth from one of the plurality of tenants
658

Provide access to the allocated bandwidth to the tenant

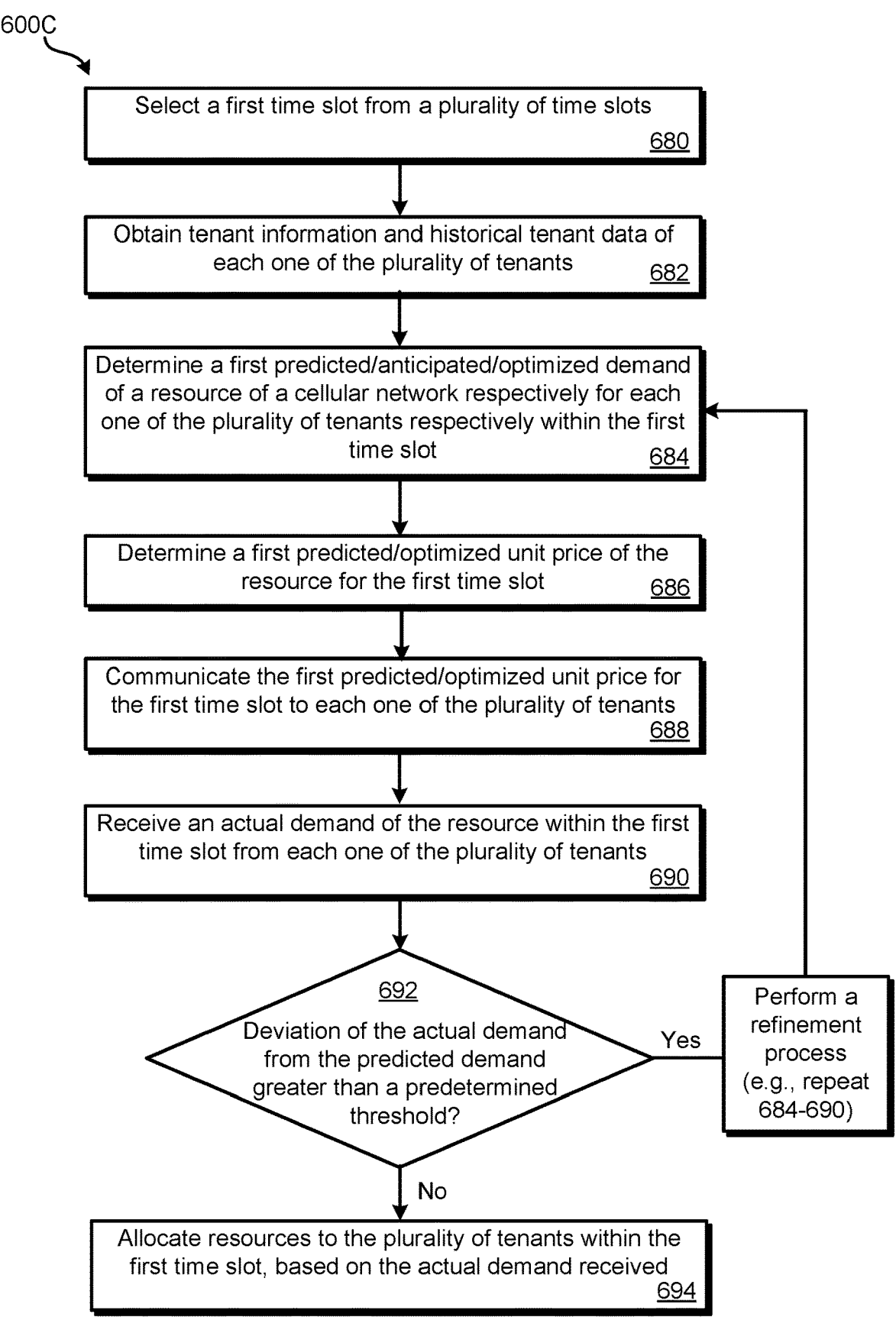

Select a first time slot from a plurality of time slots
680

Obtain tenant information and historical tenant data of
each one of the plurality of tenants          682

Determine a first predicted/anticipated/optimized demand
of a resource of a cellular network respectively for each
one of the plurality of tenants respectively within the first
time slot                                                              684

Determine a first predicted/optimized unit price of the
resource for the first time slot              686

Communicate the first predicted/optimized unit price for
the first time slot to each one of the plurality of tenants
688

Receive an actual demand of the resource within the first
time slot from each one of the plurality of tenants
690

692
Deviation of the actual demand
from the predicted demand
greater than a predetermined
threshold?

Yes

Perform a
refinement
process
(e.g., repeat
684-690)

No

Allocate resources to the plurality of tenants within the
first time slot, based on the actual demand received
694

WORKING MEMORY

760

OPERATING SYSTEM

APPLICATION(S)

765

735

PROCESSOR(S) 710

STORAGE DEVICE(S) 725

INPUT DEVICE(S) 715

OUTPUT DEVICE(S) 720

COMMUNICATIONS SUBSYSTEMS 730

ALLOCATING RESOURCES AND PROVIDING ACCESS ON-DEMAND TO RESOURCES

BACKGROUND

Traditional resource allocation methods for provisioning access to resources such as computational, network-related, or storage-based resources have historically been inflexible and rigid. These methods often rely on fixed and predetermined allocation approaches, such as quotas, Quality of Service (QoS) rules and performance requirements, or manual configurations. However, they lack the adaptability and responsiveness required to meet evolving user needs and operational demands. Moreover, resources like radio frequency (RF) spectrum and bandwidth have typically been provided to customers in a non-commoditized manner. This approach can pose challenges for network providers and service providers. For instance, non-commoditized resources often lead to intricate and customized pricing structures for each customer. The resulting complexity increases administrative burden and can cause confusion for both network providers and customers.

SUMMARY

In accordance with some embodiments of the present disclosure, a method is provided. In one example, a computer-implemented method performed by an access on-demand (AoD) provider includes obtaining tenant information and historical tenant data of each one of a plurality of tenants in connection with the AoD provider, determining a predicted/anticipated demand of a resource of a cellular network for each one of the plurality of tenants, based on the tenant information and the historical tenant data, determining a unit price of the resource, the unit price being in a range optimized based on the predicted/anticipated demand from each one of the plurality of tenants, providing the unit price to each one of the plurality of tenants, receiving an actual demand of the resource from each one of the plurality of tenants, determining that a deviation of the actual demand from the predicted/anticipated demand determined by the AoD provider is of or below a predetermined threshold, in response to the determination, allocating the resource to the plurality of tenants, based on the actual demand received from each one of the plurality of tenants, and providing access to the allocated resource to one of the plurality of tenants for one or more user equipment (UE) connected to a tenant network of the tenant to use the allocated resource.

In another example, a method includes obtaining tenant information and historical tenant data of each one of the plurality of tenants, selecting a first time slot from a plurality of time slots, determining a predicted/anticipated demand of a resource of a cellular network respectively for each one of the plurality of tenants respectively within the first time slot, determining a first unit price of the resource for the first time slot, communicating the first unit price for the first time slot to each one of the plurality of tenants, receiving an actual demand of the resource within the first time slot from each one of the plurality of tenants, determining that a deviation of the actual demand from the predicted/anticipated demand is of or below a predetermined threshold, in response to the determination, allocating the resource to the plurality of tenants within the first time slot, based on the actual demand received from each one of the plurality of tenants, and providing access to the allocated resource to one of the plurality of tenants within the first time slot.

In yet another example, a method includes: obtain tenant information and historical tenant data of each one of the plurality of tenants, selecting a first time slot and a second time slot from a plurality of time slots, the first and second time slots are consecutive, determining a first predicted/anticipated demand for a resource of a cellular network within the first time slot and a second predicted/anticipated demand of the resource within the second time slot, respectively for each one of the plurality of tenants, determining a first unit price of the resource for the first time slot and a second unit price of the resource for the second time slot, identifying a first tenant of the plurality of tenants, the first tenant requesting access to the resource in both the first and second time slots, determining a uniform unit price for the first tenant, based on the first unit price and the second unit price as well as the first predicted/anticipated demand and the second predicted/anticipated demand by the first tenant, communicating the uniform unit price for the first and second time slots to the first tenant, receiving an actual demand of the resource within the first time slot and the second time slot from the first tenant, determine that a deviation of the actual demand from the total of the first predicted/anticipated demand and the second predicted/anticipated demand is of or below a predetermined threshold, in response to the determination, allocating the resource to the first tenant within the first and second time slots, based on the actual demand received from the first tenant, and providing access to the allocated resource to the first tenant within the first and second time slots.

In accordance with some embodiments of the present disclosure, an access on-demand (AoD) provisioning system is provided. In one example, the system includes: one or more processors and a computer-readable storage media storing computer-executable instructions. The computer-executable instructions, when executed by the one or more processors, cause the system to: obtain tenant information and historical tenant data of each one of the plurality of tenants, determine a predicted/anticipated demand of a resource of a cellular network for each one of the plurality of tenants, based on the tenant information and the historical tenant data, determine a unit price of the resource, provide the unit price to each one of the plurality of tenants, receive an actual demand of the resource from each one of the plurality of tenants, determine that a deviation of the actual demand from the predicted/anticipated demand determined by the AoD provisioning system is of or below a predetermined threshold, in response to the determination, allocate the resource to the plurality of tenants, based on the actual demand received from each one of the plurality of tenants, and providing access to the allocated resource to one of the plurality of tenants for one or more UE connected to the tenant network corresponding to the tenant to use the allocated resource.

In accordance with some embodiments, the present disclosure also provides a non-transitory machine-readable storage medium encoded with instructions, the instructions executable to cause one or more electronic processors of a system such as an AoD provisioning system to perform any one of the methods described in the present disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5 is a chart illustrating an example resource allocation profile for AoD provisioning in accordance with various embodiments.

FIG. 6B is a flow diagram illustrating an example method for AoD provisioning, according to various embodiments.

DETAILED DESCRIPTION

Figure 1:
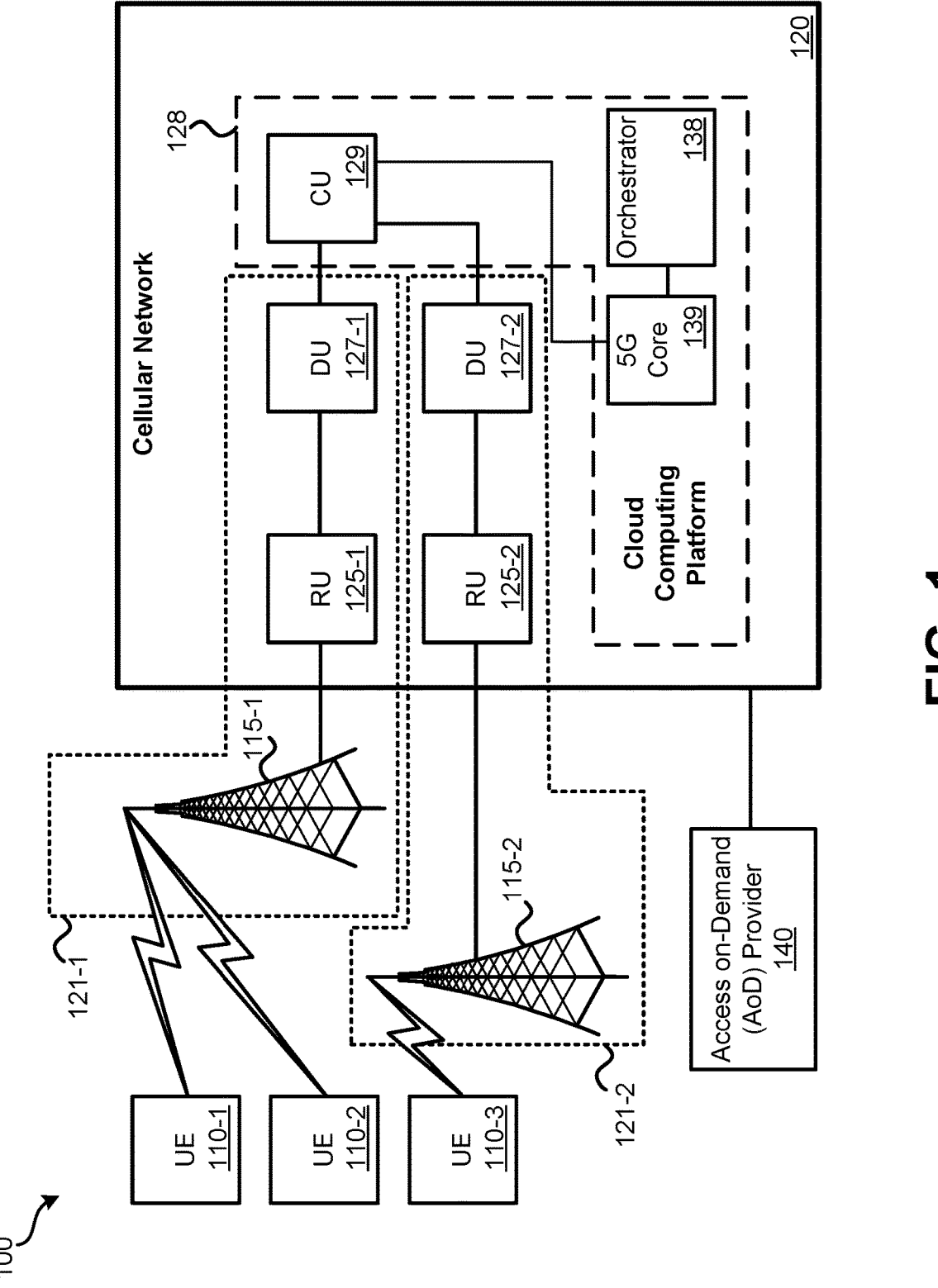
FIG. 1 is a block diagram illustrating an example of a hybrid cloud cellular network, according to various embodiments.

The present disclosure is generally related to provisioning access on-demand (AoD) to cellular wireless network resources and services to network tenants (also known as customers or clients or subscribers to network providers). In particular, the present disclosure provides techniques for allocating resources using supply-and-demand (S/D) models and provisioning AoD to allocated resources to tenants.

Access on-demand (AoD) is a network provisioning technique that leverages virtualization, cloud-native architecture, distributed infrastructure, disaggregation (such as open radio access network (O-RAN)), and "as-a-service" (XaaS) attributes within cellular wireless networks. AoD provisioning could facilitate clients such as enterprise organizations building their own private Long-Term Evolution (LTE), Fifth-Generation (5G) and Sixth-Generation (6G) wireless networks. Tenants (e.g., mobile network operators (MNOs)) of an AoD provider (also referred to as and used interchangeably with "AoD provisioning system") may utilize public cloud providers (Platform as a Service-PaaS) and private cloud systems as platforms, network functions (NFs) including containerized network functions (CNF) and virtualized network functions (VNF), and XaaS to build their wireless networks. The AoD provisioning techniques disclosed herein offer flexible access to radio unit (RU) spectrum, infrastructure, and transport as-a-service to various tenants such as 5G MNOs, enterprises, and other organizational entities. The tenants are enabled to have their own virtualized distributed unit (vDU), virtualized centralized unit (vCU), and optionally virtualized 5G core (v5G Core) in the cloud. The AoD provider may provide access to the requested resources, such as a spectrum associated to an RU, bands of the spectrum, and bandwidth portions of the spectrum or the bands, for each enterprise based on a lease determined by the enterprise (hours, days, weeks), etc.

The AoD provider may provide access on-demand to: spectrum; the RU; related radio hardware; compute and virtualization to support the vDU within an accepted latency; cloud infrastructure to support the vCU; 5G workloads and other workloads in a cloud of an enterprise's desired cloud provider; connectivity from the RU, DU, cloud providers and other locations related to the enterprise; and transport and physical links to other cloud providers that enable an enterprise to lease connectivity having specific bandwidth. The AoD provider may also provide managed services, co-managed services and self-managed services. In each such scenario, the AoD provider may provide key performance indicators (KPIs) and statistics via a multi-tenant dashboard in the enterprise's desired public or private cloud. The AoD provider may provide managed services by managing the RU, vDU, vCU, 5G workloads and other workloads of an enterprise. The AoD provider may provide co-managed services by managing the RU, vDU and vCU while providing the enterprise the ability to deploy and/or manage their own 5G workloads and other workloads. The AoD provider may provide self-managed services by managing the RU while providing the enterprise the ability to deploy and/or manage their own vDU, vCU and 5G workloads and other workloads.

An enterprise subscriber to the AoD provider may lease from the AoD provider access to RU and spectrum having specific bandwidth. The enterprise instantiates some of their NFs to reside in the AoD private cloud and other NFs in a private or public cloud provided by a could service provider of their choice. The enterprise leases their desired NFs, spectrum and transport (all as-a-service) to build their 5G networks.

Further details regarding various embodiments of the present disclosure are provided below in relation to the figures. FIG. 1 illustrates a block diagram of a hybrid cellular network system 100 (hereinafter "system 100"). System 100 can include a 5G New Radio (NR) cellular network; as noted, other types of cellular networks, such as Long-Term Evolution (LTE), Sixth-Generation (6G), Seventh-Generation (7G), etc., may also be possible. System 100 can include: user equipment (UE) 110 or (UE 110-1, UE 110-2, UE 110-3); structure 115; cellular network 120; radio units 125 ("RUs 125"); distributed units 127 ("DUs 127"); centralized unit 129 ("CU 129"); 5G core 139; orchestrator 138, and an access on-demand provider 140. FIG. 1 represents a component-level view. In an open radio access network (O-RAN), because components can be implemented as specialized software executed on general-purpose hardware, except for components that need to receive and transmit RF, the functionality of the various components can be executed by general-purpose servers. For at least some components, the hardware may be maintained by a separate cloud-service computing platform provider. Therefore, the cellular network operator may operate some hardware, such as RUs and local computing resources on which DUs are executed, such components may be connected with a cloud-computing platform on which other cellular network functions, such as the core and CUs are executed.

UE 110 can represent various types of end-user devices, such as cellular phones, smartphones, cellular modems, cellular-enabled computerized devices, sensor devices, robotic equipment, IoT devices, gaming devices, access points (APs), or any computerized device capable of communicating via a cellular network. More generally, UE can represent any type of device that has an incorporated 5G interface, such as a 5G modem. Examples can include sensor devices, Internet of Things (IoT) devices, manufacturing robots, unmanned aerial (or land-based) vehicles, network-connected vehicles, etc. Depending on the location of individual UEs, UE 110 may use RF to communicate with various BSs of cellular network 120. As illustrated, two BSs are illustrated: BS 121-1 can include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas can reasonably be mounted to provide cellular coverage to a geographic area. Similarly, BS 121-2 can include: structure 115-2, RU 125-2, and DU 127-2.

Real-world implementations of system 100 can include many (e.g., thousands) of BSs and many CUs and 5G core 139. BS 121-1 can include one or more antennas that allow RUs 125 to communicate wirelessly with UEs 110. RUs 125 can represent an edge of cellular network 120 where data is transitioned to RF for wireless communication. The radio access technology (RAT) used by RU 125 may be 5G NR, or some other RAT. The remainder of cellular network 120 may be based on an exclusive 5G architecture, a hybrid 4G/5G architecture, or some other cellular network architecture that supports cellular network slices. BS 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU can also operate on three bands. One or more DUs, such as DU 127-1, may communicate with CU 129. Collectively, an RU, DU, and CU create a gNodeB, which serves as the radio access network (RAN) of cellular network 120. DUs 127 and CU 129 can communicate with 5G core 139. The specific architecture of cellular network 120 can vary by embodiment. Edge cloud server systems (not illustrated) outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability. It should be noted that the number of RUs in the cellular network 120 may vary, depending on the design requirements.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized implementation, CU 129, 5G core 139, and/or orchestrator 138 can be implemented virtually as software being executed by general-purpose computing equipment on cloud-computing platform 128, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where 5G core 139 is executed, while other functions are executed at a separate server system or on a separate cloud computing system. In the illustrated embodiment of system 100, cloud-computing platform 128 can execute CU 129, 5G core 139, and orchestrator 138. The cloud-computing platform 128 can be a third-party cloud-based computing platform or a cloud-based computing platform operated by the same entity that operates the RAN. Cloud-computing platform 128 may have the ability to devote additional hardware resources to cloud-based cellular network components or implement additional instances of such components when requested.

Kubernetes, Docker®, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new DU for test, orchestrator 138 can perform a pipeline of calling the DU code from a software repository incorporated as part of, or separate from cellular network 120, pulling corresponding configuration files (e.g., helm charts), creating Kubernetes nodes/pods, loading DU containers, configuring the DU, and activating other support functions (e.g., Prometheus, instances/connections to test tools).

As described above, the AoD provider 140 in connection with the cellular network 120 is responsible for provisioning AoD to resources and services of the cellular network 120 (e.g., the spectrum provided by RU 125, network functions provided by the 5G core, and computing resources provided by the hardware within the cellular network 120, etc.) to various tenants for the UE 110 associated with the tenants or clients to use. One or more UE 110 may belong to a particular tenant registered or associated with the AoD provider 140. More examples of the AoD provider 140 are described below in details with references to FIGS. 3A-3B.

Figure 2:
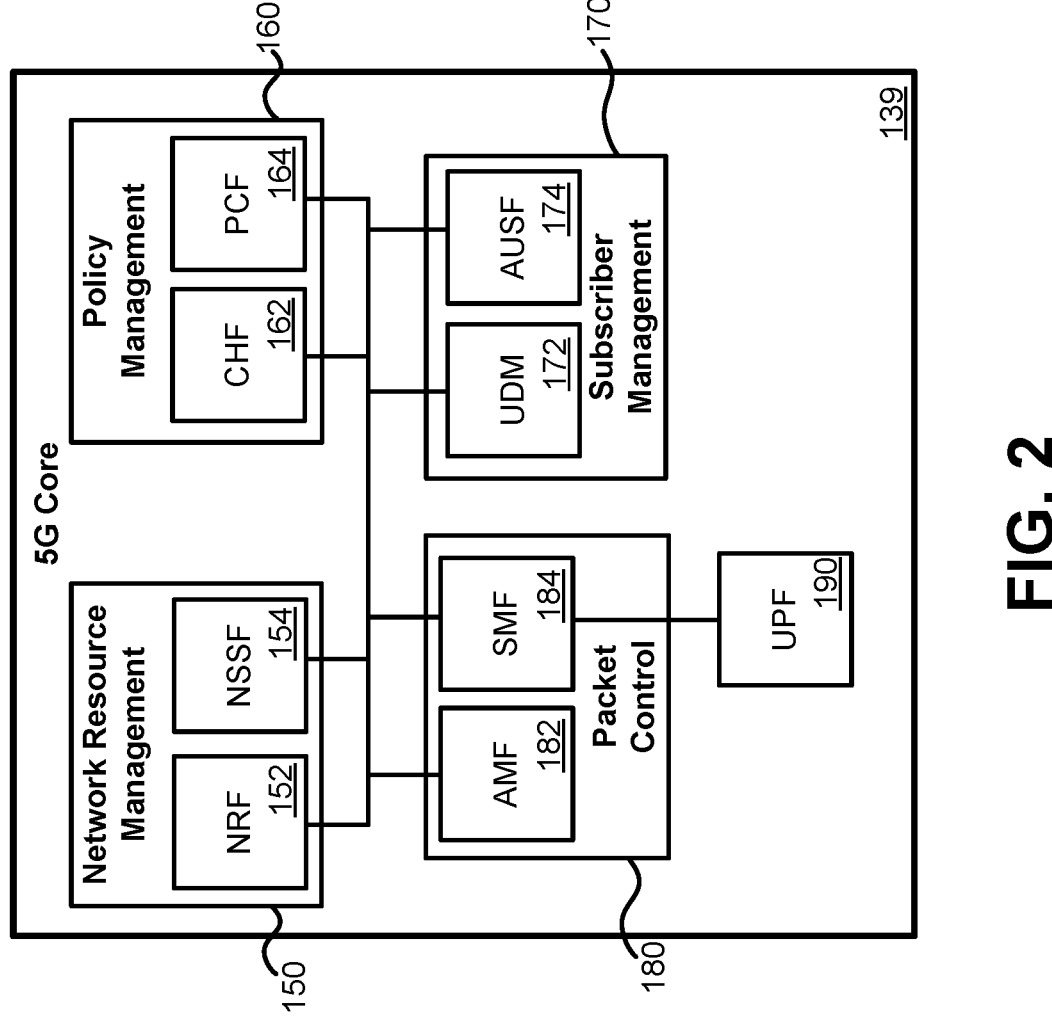
FIG. 2 is a block diagram illustrating an example of a 5G core, according to various embodiments.

FIG. 2 illustrates a block diagram of a cellular network core, which can represent 5G core 139. 5G core 139 can be implemented on a cloud-computing platform. 5G core 139 can be physically distributed across data centers (e.g., central national data center (NDC) and regional data center (RDC)), or located at a central national data center (NDC), and can perform various core functions of the cellular network. 5G core 139 can include various network functions and network elements including but not limited to: network resource management components 150; policy management components 160; subscriber management components 170; and packet control components 180. Individual components may communicate on a bus, thus allowing various components of 5G core 139 to communicate with each other directly. 5G core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) 195 (e.g., the Internet) or various access networks 197. Access networks 197 can include the RAN of cellular network 120 of FIG. 1A.

It should be noted that various components of the cellular network 120 can be virtualized and instantiated in a disaggregated O-RAN architecture. For example, the RU 125 of FIG. 1 may operate in a disaggregated open RAN environment and operably connected to the structure 115 of a cellular network 120. RU 125 can provide lower physical layer (L-PHY) and radio frequency (RF) functionality for the cellular network 120. For example, this may include amplifying, digitizing, transmitting and receiving the RF signals associated with structure 115 for the cellular network 120. The DU 127, which may be virtualized in a private or public cloud (e.g., vDU 327 of FIG. 3B) provides higher physical layer (H-PHY) layer, media access control (MAC) layer, and the radio link control (RLC) layer for the cellular network 120. The vDU may be connected to the RU via an Enhanced Common Public Radio Interface (eCPRI) connection, which is an open interface (i.e., the end point can be from different vendors). The CU 129, which may also be virtualized in a private or public cloud (e.g., vCU 329 of FIG. 3B) may provide Packet Data Convergence Protocol (PDCP) layer, Service Data Adaptation Protocol (SOAP), and radio resource controller (RRC) functionality for the cellular network 120. The vCU is connected to the vDU via the fifth generation (5G) New Radio (NR) 5G NR F1 interface, which is an open interface (i.e., the end point can be from different vendors).

Figure 3A:
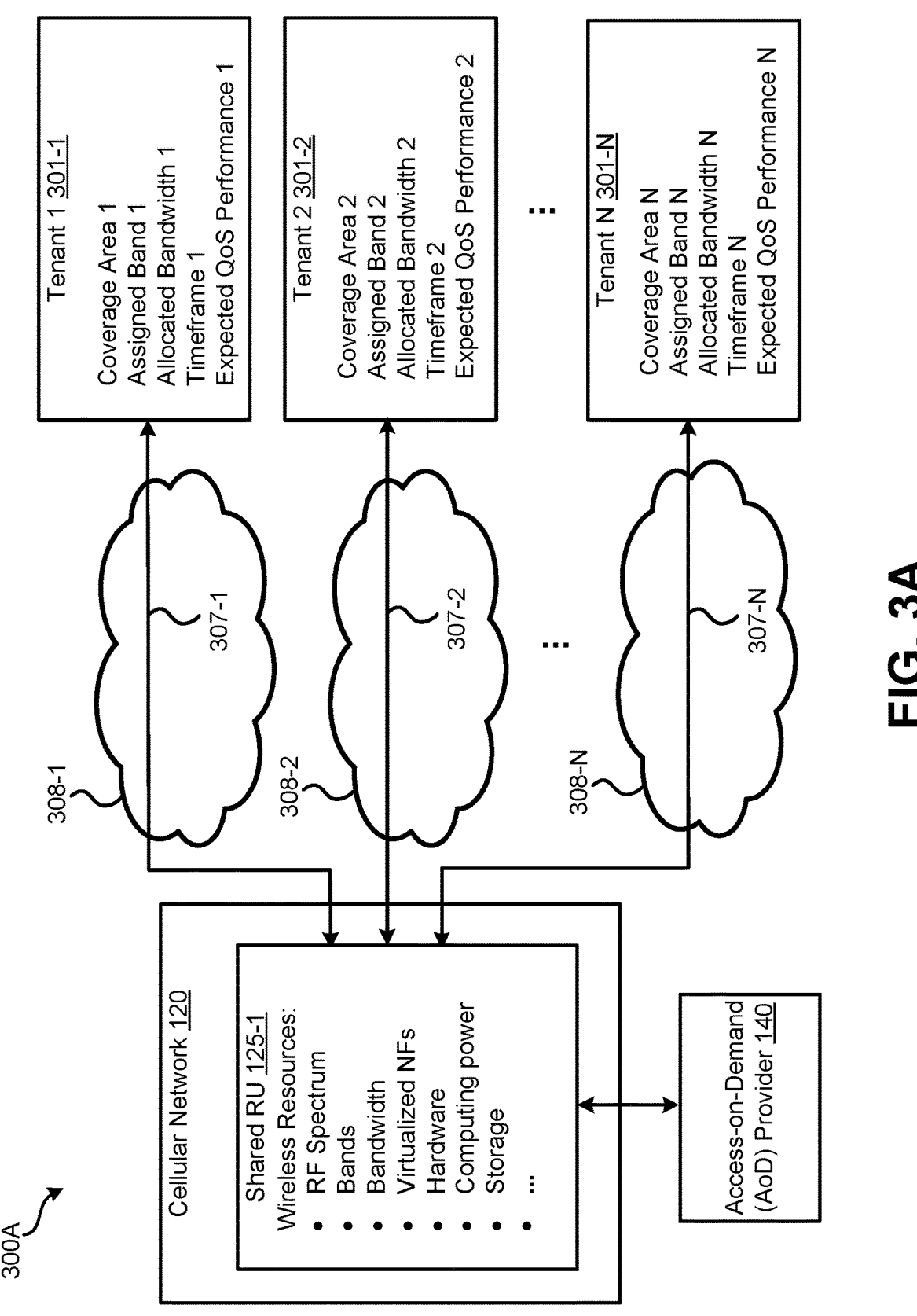
FIG. 3A is a block diagram illustrating an example communications system for provisioning access on-demand (AoD) to a resource in accordance with various embodiments.

FIG. 3A is a block diagram illustrating an example communications system 300A (hereinafter "system 300A") for providing AoD to resources in accordance with various embodiments. In the illustrated example, the system 300A includes, among other components, a cellular network 120 including a RU 125-1, an AoD provider 140, and multiple AoD network tenants 301 (herein after tenants 301). The tenant 301 is also referred to as AoD network client or AoD network consumer or AoD network subscriber. The tenant 301 may be an entity that has one or more UE 110 belonging to the tenant 301. The one or more UE 110 can communicate with the cellular network 120 and obtain access to the resources and services provided by the cellular network 120. For example, the tenant 301 may refer to mobile service providers, private networks, businesses, government organizations, schools, colleges, other entities, other enterprises, etc., or any other person, organization, enterprise or entity that may own, operate or control a private or public wireless network of any size and for any purpose.

For example, tenant 301 may be a mobile network operator (NMO) of an enterprise that would like to quickly stand up and operate their own private 5G wireless networks in particular geographic regions and for particular time periods, such as businesses, private organizations, public organizations, etc., but don't necessarily have the wireless spectrum, physical equipment, or other physical resources to do so. In such instances, the MNOs may lease use of such resources and access from AoD provider 140, which provides such access on-demand by offering shared use of RU 125-1 (and optionally other RUs such as RU 125-2, etc.), wireless transport, logical and physical telecommunication links, connectivity, optional use of one or more AoD private clouds 308 (e.g., 309-1, 309-2, . . . , 308-N) to host wireless NFs, and management of such NFs.

In the illustrated example, a number (N) of tenants 301 (i.e., 301-1, 301-2, . . . , 301-N) are communicatively connected to the cellular network 120 respectively through a number (N) of connections 307 (i.e., 307-1, 307-2, . . . , 307-N). For convenience of discussion, each tenant 301 is denoted as 301-i, each connection 307 is similarly denoted as connection 307-i, and each AoD private cloud 308 is denoted as 308-i, wherein i=1, . . . , N, and N is an integer greater than 1.

As mentioned above, the various resources of the cellular network 120 such as radio frequency spectrum, bands of the spectrum, bandwidth of the band or a portion thereof, time-frequency resources, virialized NFs, physical equipment (e.g., radio hardware, amplifiers, filters, A/D converters, wiring, antennas, base-station towers), as well as other computing and storage resources provided by the RU 125-1 can be assigned and/or allocated to tenants 301, such that the tenants 301 can share the resources and each use a portion thereof. The AoD provider 140 can customize resources for each MNO based on an allocation profile or scheme that is predetermined based on various factors such as the tenant experience level, tenant registration status, geographic region to be covered, bandwidth, timeframes needed (e.g., times of day, days of week, weeks of year, months of year, other requested time schedules, etc.), expected QoS requirements such as latency, maximum data transmission rate, service level agreement (SLA) and service level objectives (SLOs), requested hosting of NFs on AoD private cloud, and management of such NFs, among others. The resources and services can then be provided to the tenants 301 upon request, according to the predetermined resource allocation profile. Such sharing of the shared RU 125 and AoD private cloud 308 as described herein may facilitate enterprise tenants, such as MNOs, to build their own private cellular wireless telecommunication networks, using the resources allocated thereto according to the predetermined resource allocation profile, without owning infrastructure, spectrum, radio hardware, etc.

Figure 3B:
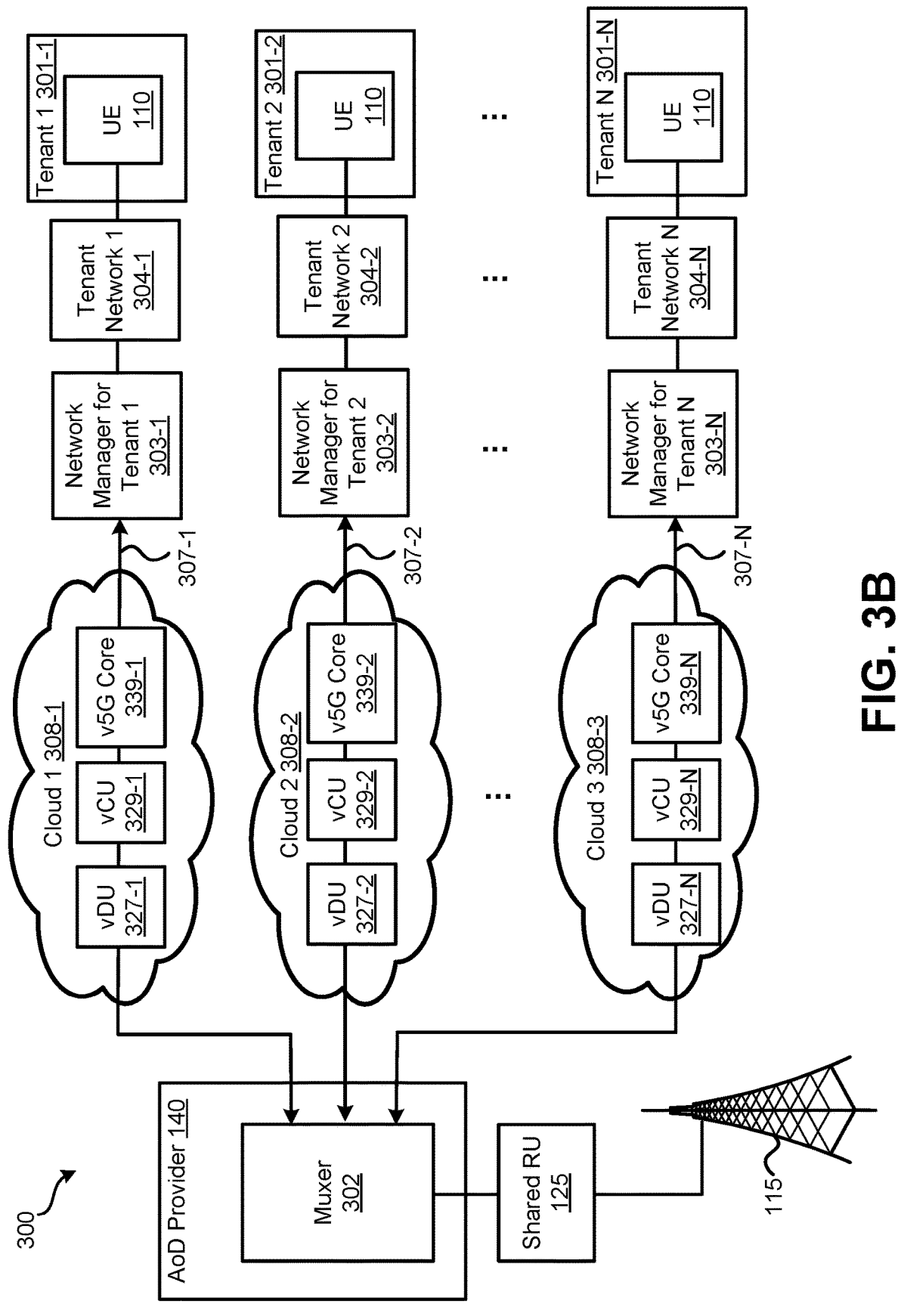
FIG. 3B is a block diagram illustrating another example communications system for provisioning AoD to a resource in accordance with various embodiments.

FIG. 3B is a block diagram illustrating another example communications system 300B (hereinafter "system 300B") for providing AoD to resources in accordance with various embodiments. In the illustrated example, the system 300B includes, among other components, an AoD provider 140, a shared RU 125 operably connected to a structure 115, multiple tenants 301-*i*, multiple tenant networks 304-*i*, multiple network managers 304-*i*, and multiple clouds 308-*i*, where i=1, 2, . . . , N, and N is an integer greater than 1.

The various tenants 301-*i* have their own DUs (e.g., virtualized Dus (vDUs), CUs (e.g., virtualized CUs (vCUs), and optionally virtualized 5G Core/Internet Protocol (IP) Multimedia subsystem (IMS) NFs operating in one or more clouds 308-*i* (which may be private clouds or public clouds) that may be or may not be AoD private clouds associated with the shared RU 125 or the AoD provider 140. Cloud computing is the on-demand availability of computer system resources, especially data storage and computing power, without direct active management by the user. Large clouds often have functions distributed over multiple locations, each of which is a data center. In particular, the present example of FIG. 3B shows that: each of the tenant 301-*i* owns or instantiates their own vDU 327-*i*, vCU 329-*i*, and optionally v5G Core 339-*i* that operate in private or public cloud 308-*i*. According to the disaggregated model, each tenant 301-*i* may select different individual vendors to provide and/or manage their respective vDUs 327-*i*, vCUs 329-*i* and/or v5G Cores 339-*i*.

Various network connections 307-*i* (e.g., Internet connections) and applicable logical telecommunication network interfaces may connect the vDU 327-*i*, vCUs 329-*i*, and optionally v5G Core 339-*i* operating in private or public cloud 308-*i* to the corresponding tenant network 304-*i*, through the corresponding network manager 303-*i*. The network manager 303-*i* may be a gateway system or device responsible for managing the tenant network 304-*i* and further provide the AoD to resources to the UE 110 associated with the tenant 301-*i* and connected to the tenant network 304-*i*. In one example, the network manager 303-*i* may further include routing functionality for determining the path or traffic for data packets to travel between the tenant network 304-*i* and external networks and routing traffic to each individual UE 110, mapping private IP addresses within the tenant network to a single public IP address for communication with individual UE 110, analyzing the content of data packets, managing data traffic within the tenant network 304-*i*, among others.

The various network connections 307-*i* and applicable logical telecommunication network interfaces (e.g., individual eCPRI interfaces) may further connect each vDU 327-*i* operating in private or public cloud 308-*i* to the multiplexer (muxer) 302 of the AoD provider 140. The muxer 302 is operably coupled to the RU 125 in a manner that enables several input signals comprising cellular wireless telecommunication network traffic of tenant network 304-*i*, to be able to share resources provided by the RU 125.

In one example embodiment, the AoD provider 140 may electronically apportions a spectrum made available by the RU 125 for cellular wireless telecommunication into a plurality of bands. In some embodiments, the AoD provider 140 may further apportion each band into multiple bandwidth portions (also referred to as and used interchangeably with "bandwidth parts (BWP) or bandwidth segments (BWS)). Such BWPs are apportioned for use by multiple tenants 301-*i*. The tenants 301-*i* may instantiate their NFs in the cloud 308-*i* and connect their vDUs 327-*i* to the shared RU 125. The shared RU 125 knows the spectrum and the bandwidth allocated to each tenant 301-*i* (e.g., by receiving an instruction of resource allocation based on a predetermined resource allocation profile generated from the AoD provider 140). In the present example, tenants 301-*i* do not have any radio hardware, as the shared RU 125 provides that on-demand. Thus, the shared RU 125 facilitates the tenants 301-*i* to build their own respective private networks without owning infrastructure, spectrum, radio hardware, etc., by following the AoD model as described herein.

In one embodiment, the time-division duplexing (TDD) alignment between the tenants 301-*i* is provided by the shared RU 125. For example, the tenants 301-*i* may use the same timing, frequency, and phase provided by the shared RU 125. The tenants 301-*i* could use the same TDD downlink/uplink (DL/UL) frame structure and DL/UL ratio. However, in other embodiments, including those with 3GPP Rel-16 RIM/CLI management, this is not necessary. The shared RU 125 may be responsible for synchronization with the tenants 301-*i* outside of the shared RU 125 framework. In an example embodiment, carrier aggregation (CA) or dual connectivity (DC) is supported by the tenant 301-*i* completely transparent to the shared RU 125 or the AoD provider 140. Furthermore, due to orthogonality of DL/UL signals and/or the isolated connections 307-*i*, the shared RU 125 may in various embodiments create lower interference or no interference between the tenants 301-*i* connected to it.

Figure 4:
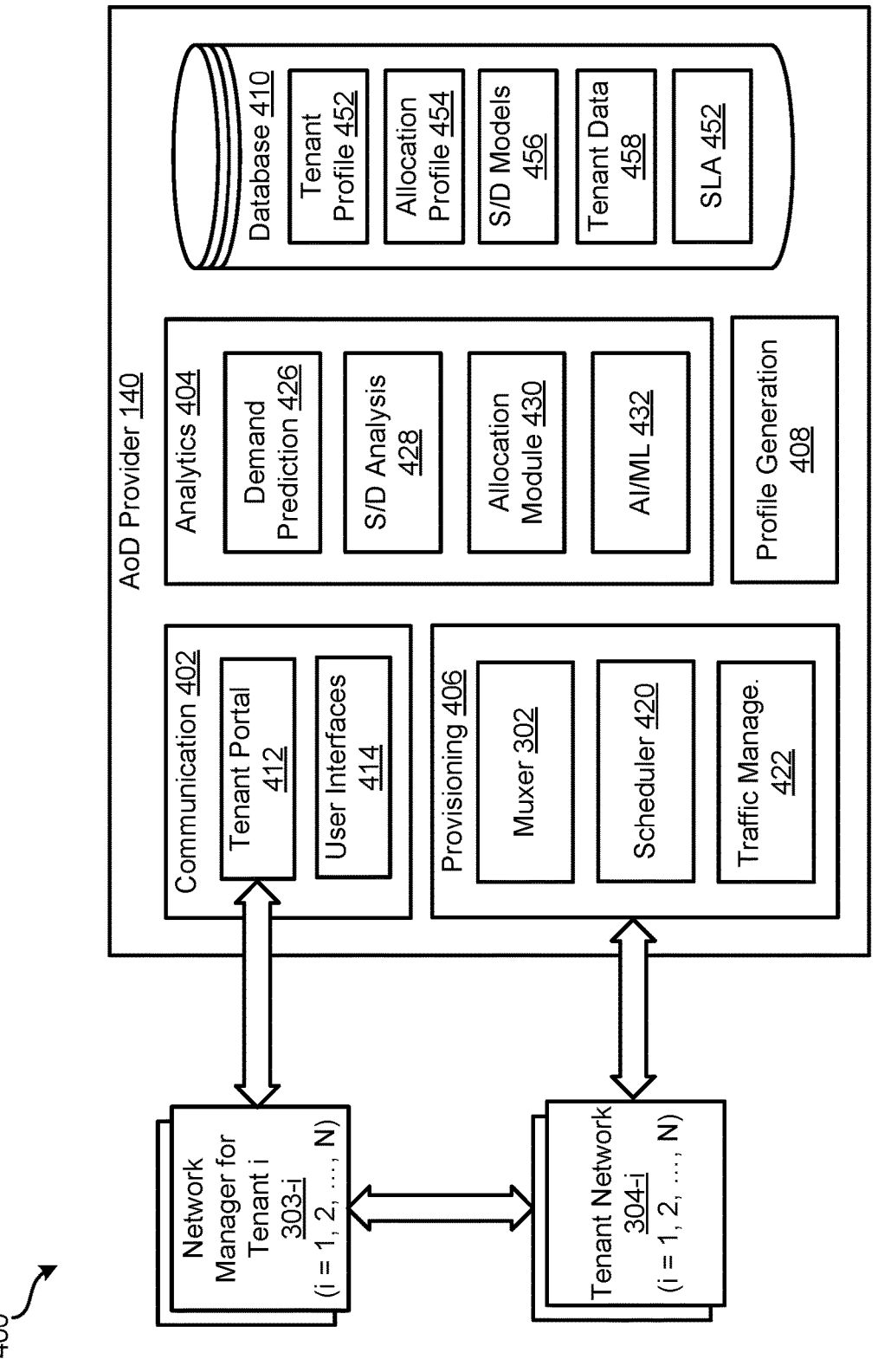
FIG. 4 is a block diagram illustrating another example communications system for allocating a resource and provisioning AoD to the resource, in accordance with various embodiments.

FIG. 4 is a block diagram illustrating another example communications system 400 (herein after "system 400") for allocating resources and providing AoD to resources in accordance with various embodiments. In the illustrated example, system 400 includes, among other components, an AoD provider 140, multiple network managers for tenants 303-*i* communicatively connected to the AoD provider 140, and multiple tenant networks 304-*i* communicatively connected to the AoD provider 140 and the multiple network managers for tenants 303-*i*, where i=1, 2, . . . , N, and N is an integer greater than 1.

The AoD provider 140 further includes, among other components, a communication device 402, an analytics device 404, an AoD provisioning device 406, a profile generation module 408, and a database 410. Various devices, modules, and components included in the AoD provider 140 may be a hardware component, a software component, or a combination thereof. Additional components may also be included in the AoD provider 140.

In the illustrated example of FIG. 4, the communication device 402 further includes, among other components, a tenant portal 412 and one or more user interfaces 414. The tenant portal 412 may be an application programming interface (API) that provides an interface for the multiple network managers 303-*i* of the tenants 301-*i* to communicate with the AoD provider 140. For example, the tenant portal 412 may facilitate receiving an AoD request for access to resources and services from the network managers 303-*i*, receiving tenant data/information (e.g., tenant identity, geographic location, service type, device type, demand of resource, QoS attributes, SLAs, resource usage data, network performance data, etc.) from the network managers 303-*i*, communicating resource information (e.g., available resources, allocated resources, unit price, associated with resource usage, and any other pertinent information) to the network managers 303-*i*. The tenant portal 412 may also facilitate communicating a service catalog or marketplace to the tenants 301-*i* for the tenants 301-*i* to browse and select from a range of available services and resources, communicating billing statements and invoices for tenants 301-*i* based on their resource usage and service subscriptions, sending notifications about service updates, maintenance schedules, and other information regarding AoD provisioning. The user interface 414 may provide a graphical or command-line interface for various users (e.g., an AoD administrator or cellular network administrator) to access and manage the AoD provisioning, check network status, perform tasks, and configuring network settings.

The analytics device 404 is responsible for analyzing the demand and supply of resources, commoditizing the resources, determining unit price for resources, and optimizing resource allocation for AoD provisioning. In some embodiments, the analytics device 404 further includes, among other components, a demand prediction module 426, a supply-and-demand (S/D) module 428, a resource allocation module 430, and an artificial intelligence/machine learning (AI/ML) module 432.

The demand prediction module 426 is responsible for predicting demand for a resource of a cellular network from each one of the multiple tenants 301-*i*. In some embodiments, the resource is a radio frequency band (hereinafter "band") of a BWP of the band. The band may be a portion of a radio frequency spectrum associated with an RU (e.g., the shared RU 125 of the cellular network 120). The demand prediction module 426 may analyze the tenant information and historical tenant data obtained from each tenant 301-*i* to determine a demand of bandwidth. The tenant information may include various data points including service type data, device quantity data, device type data, application type data, coverage area data, location proximity data. The historical tenant data may include various QoS attributes of the tenants such as signal strength data, signal-to-noise (S/N) ratio data, reliability data, maximum throughput (peak load data transmission rate) data, latency data. The historical tenant data may further include historical bandwidth usage data (e.g., percentage of bandwidth actually used by the tenant against the bandwidth allocated to the tenant). The demand prediction module 426 may extract tenant features from the tenant information and historical tenant data. The extracted features capture critical aspects of each tenant's behavior and anticipated QoS and performance requirements. Feature extraction may involve data preprocessing, transformation, and selection to identify the most informative attributes. Using the extracted tenant features, the demand prediction module 426 may construct a demand prediction model for each tenant individually (i.e., tenant 301-*i*). In some embodiments, the demand prediction model may follow a value function model described below with references to equations (1)-(3). These demand prediction models may be in a form of mathematical representations that correlate tenant-specific features to their bandwidth demands. Various techniques, such as regression analysis, machine learning algorithms, or statistical methods, can be employed to build these models.

In some embodiments, the demand prediction module 426 and the AI/ML module 432 may operate in a collaborative or conjunctive manner to enhance the demand prediction. In one example, the AI/ML module 432 may collect the historical tenant data for each tenant 301-*i*, which includes: historical bandwidth usage data (e.g., monthly bandwidth consumption percentages) and tenant-specific attributes (e.g., service type, device quantity, application type). The AI/ML module 432 may preprocess and transform the historical tenant data to create relevant features (e.g., converting categorical tenant attributes into numerical values, extracting time-related features, such as the hours, days, months, or seasons to capture seasonality or trends in bandwidth usage). In some embodiments, the AI/ML module 432 may split the historical tenant data into a training dataset and a testing dataset (e.g., using 80% of the historical tenant data for training and reserving 20% for testing the ML model's accuracy). The AI/ML module 432 may choose an appropriate ML model for demand prediction. For example, a time-series forecasting model like Long Short-Term Memory (LSTM) recurrent neural network model may be used to capture temporal patterns for the bandwidth usage of a specific tenant 301-*i*. Other ML models may also be used for demand prediction. The AI/ML module 432 may train the ML model using the training dataset. For example, the ML model may be trained to learn to map historical bandwidth usage and tenant attributes to predict future bandwidth demand. The ML model may also be trained to consider any relevant external factors, such as market trends or network performance metrics. The ML model may be further trained to optimize hyperparameters through various techniques such as grid search or random search to improve prediction accuracy. The AI/ML module 432 may validate the ML model's performance using the testing dataset using validation metrics such as Mean Absolute Error (MAE) or Root Mean Squared Error (RMSE). The AI/ML module 432 may deploy the ML model for demand prediction once the ML mode performs satisfactorily. The AI/ML module 432 may continuously feed real-time data into the deployed ML model, including updated tenant attributes and historical bandwidth usage. The ML model can generate predictions for future bandwidth demand for each tenant 301-*i* on an ongoing basis. The AI/ML module 432 may continuously monitor the ML model's performance and retrain it periodically with new historical tenant data to adapt to changing tenant behavior.

The S/D analysis module 428 is responsible for constructing an S/D model and predicting/determining a demand of the resource for each tenant 301-*i* as well as a unit price of the resource for the AoD provider. In some embodiments, the S/D analysis module 428 can construct a value function model for each tenant 301-*i*, each value function model representing the value obtained by the tenant from the resources. An example value function model may be based on the following equation (1):

$$V_i(x_i) = B_i(x_i) - C(x_i) \qquad (1)$$

wherein $V_i(x_i)$ is a total value function representing the total value obtained by a specific tenant 301-$i$, $B_i(x_i)$ is a total benefit function representing the total benefit obtained by that specific tenant 301-$i$, and $C(x_i)$ represents the total cost of the resource (e.g., bandwidth) for that specific tenant 301-$i$. The total cost of the resource may be further represented by the following equation (2)

$$C(x_i) = P * x_i \qquad (2)$$

wherein P represents the unit price for the resource. Thus, the example S/D mode is based on the commoditization of the resource, and the unit price P is the same for all the tenants 301-$i$, where i=1, 2, . . . , N, and N is an integer greater than 1.

For a tenant 301-$i$, $B_i(x_i)$ is typically an increasing function (i.e., the benefits obtained by a tenant increases as the resource usage $x_i$ of the tenant increase). However, the $B_i(x_i)$ may be a concave function (i.e., not strictly linear or increasing). Instead, the benefits derived from additional resource usage might exhibit diminishing returns. In other words, as a tenant 301-$i$ uses more resources, the incremental increase in benefits becomes smaller. The total cost $C(x_i)$ depends on the product of unit price (P) and the demand ($x_i$). It should be noted that the S/D analysis module 428 may be operable to generate a generic total benefit function $B(x_i)$ that is common to all tenants 301-$i$. Accordingly, the value function $V_i(x_i)$ may also be the same across the tenants 301-$i$ (denoted as $V(x_i)$). Thus, equations (I) and (II) can be combined and rewritten into the following equation (III):

$$V(x_i) = B(x_i) - P * x_i \qquad (3)$$

wherein $V(x_i)$ is a total value function representing the total value obtained by each tenant 301-$i$, $B(x_i)$ is a total benefit function representing the total benefit obtained by each tenant 301-$i$, and $C(x_i)$ represents the total cost of the resource (e.g., bandwidth) for each tenant 301-$i$. The value function $V(x_i)$ and the benefit function $B(x_i)$ are consistent and identical among all tenants 301-$i$. This simplification streamlines the demand prediction model by making the value and benefit functions uniform across tenants. This consistency in the value and benefit functions allows for a more standardized approach to pricing and resource allocation, as all tenants use the same functions to evaluate the benefits of resource usage relative to the unit price (P) and cost $C(x_i)$.

On the other hand, The S/D analysis module 428 can also construct a total income model for optimizing the total income (I) of the AoD provider 140. An example total income mode can be constructed based on the product of the unit price (P) and the total demand (W) of the resource from all tenants 301-$i$, represented by the following equation (4):

$$I = P * W = P * \sum_{i=1}^{N} x_i \qquad (4)$$

Based on an assumption that each tenant 301-$i$ intends to maximize their respective total value $V(x_i)$, and the AoD provider 140 intends to maximize the total income (I), the S/D model can be constructed to determine an equilibrium point and obtain a predicted/anticipated demand of resource for each tenant 301-$i$ as well as a predicted/optimized unit price for the AoD provider 140 at the equilibrium status or equilibrium point. At the equilibrium status or equilibrium point, each tenant can obtain a total value that exceeds a predetermined value threshold (i.e., meeting the expectation of the total value for that tenant), and the AoD provider can obtain a total income that exceeds a predetermined income threshold (i.e., meeting the expectation on the total income for the AoD provider). In some embodiments, each tenant can maximize their total value, and the AoD provider can maximize the total income. The S/D model thus represents how tenants' demand for resources impacts the unit price (P). Tenants 301-$i$ adjust their resource demands based on their perceived benefits, while the AoD provider 140 determines the unit price to maximize total income (I).

In some embodiments, the S/D model described herein may follow a game theory. In one particular example, the S/D model follows a non-cooperative game, and a Nash Equilibrium Status (NES) can be determined using the S/D model based on the game theory. A NES in the context of the S/D model can be a situation where no tenant 301-$i$ has an incentive to unilaterally change their resource demand ($x_i$) given the unit price (P) set by the AoD provider 140, and the AoD provider 140 has no incentive to change the unit price (P) given the resource demands of tenants. In other words, the NES describes a stable state where both tenants 301-$i$ and the AoD provider 140 have made decisions, and no one would benefit from changing their decision alone. The predicted/anticipated demand for each tenant 301-$i$ as well as the predicted/optimized unit price for the AoD provider 140 may be obtained at the NES. In some embodiments, the predicted/anticipated demand can be in a range optimized by the S/D model. Likewise, the predicted/optimized unit price can also be in a range optimized by the S/D model. Within the optimized demand range and the optimized price range, the predicted/anticipated demand and the predicted/optimized unit price would result in each tenant achieving a total value exceeding a predetermined value threshold and result in the AoD provider achieving a total income exceeding a predetermined income threshold. The optimized demand range and price range can each be delineated by an upper limit and a lower limit, both of which can be determined using the S/D model to achieve the predetermined value threshold and the predetermined price threshold.

In an example process to determine the NES, the following steps may be taken. Each tenant 301-$i$ aims to maximize their total value ($V(x_i)$) (or cause the total value ($V(x_i)$) to exceed a predetermined value threshold, e.g., 90% of the maximized total value ($V(x_i)$) by adjusting their resource demand ($x_i$) while considering the unit price (P) set by the AoD provider 140. This results in the following equation (5) for each tenant:

$$\frac{dV(x_i)}{dx_i} = \frac{dB(x_i)}{dx_i} - P = 0 \qquad (5)$$

On the other hand, the AoD provider 140 aims to maximize its total income (W) (or to cause its total income (W) to exceed a predetermined income threshold, e.g., 90% of the maximized total income (W)) by optimizing the unit price (P), which may be common for all tenants 301-$i$. The predicted/optimized unit price (P(predicted) or P(optimized)) is obtained when the AoD provider sets it such that it maximizes its total income (W). This may occur when the derivative of the total income (I) with respect to the unit price (P) is zero, based on the following equation (6), which means that increasing or decreasing P would not further maximize income:

$$\frac{dI}{dP} = 0 \tag{6}$$

The NES can be determined based on equations (5) and (6) and the specific value function $(V(x_i))$ as well as the and the specific total income (I). The predicted/anticipated/optimized demand ($x_i$(predicted) or $x_i$(anticipated) or $x_i$(optimized)) for each tenant 301-i as well as the predicted/optimized unit price ((P(predicted)) for the AoD provider 140 can be obtained at the NES. The "predicted/anticipated demand" and "predicted unit price" can also be respectively understood as and used interchangeably with "optimized demand" and "optimized price" according to the present disclosure. In complex scenarios, various numerical methods or specific demand and supply functions may be involved in obtaining the predicted/optimized demand and the predicted/optimized unit price. It should be noted that the game theory and NES described above are for illustrative purposes only, and other economic models and demand-and-supply models can also be used to optimize the demand and unit price for resource allocation.

In a particular example, an S/D model and a process for determining the NES based on the S/D model are provided below. The total value $V(x_i)$ for each tenant 301-i may follow the equation (7) below:

$$V(x_i) = A_i * \log(x_i + 1) - P * x_i \tag{7}$$

wherein $A_i$ is a known factor depending on the tenant 301-i.

The total demand (W) is represented by equation (8) below:

$$W = \sum_{i=1}^{N} x_i \tag{8}$$

In this example S/D model, The NES can be determined, for example, by maximization of the total value $V(x_i)$ for each tenant 301-i may be achieved within the example S/D model by taking differential of equation (7) and deriving the following equation (5):

$$\frac{dV(x_i)}{dx_i} = A_i * \frac{d\log(x_i + 1)}{dx_i} - P = \frac{A_i}{x_i + 1} - P = 0 \tag{9}$$

Accordingly, the predicted/optimized demand ($x_i$(predicted)) at the NES can be represented by the equation (10) below:

$$x_i(\text{predicted}) = \frac{A_i}{P} - 1 \tag{10}$$

The total predicted/anticipated demand for all tenants 301-i is represented by the equation (11) below:

$$W = \sum_{i=1}^{N} x_i = \sum_{i=1}^{N} \frac{A_i}{P} - N = \frac{1}{P} \sum_{i=1}^{N} A_i - N \tag{11}$$

Accordingly, the predicted/optimized unit price (P(predicted)) at the NES can be represented by the equation (12) below:

$$P(\text{predicted}) = \frac{\sum_{i=1}^{N} A_i}{W + N} \tag{12}$$

These values (i.e., the predicted/optimized demand ($x_i$(predicted)) and the predicted/optimized unit price (P(predicted)) represent a stable state where neither tenants 301-i nor the AoD provider 140 have an incentive to change their decisions unilaterally.

It should be noted that the S/D model and NES may significantly depend on the value function $V(x_i)$ and the benefit function $B(x_i)$ for each tenant 301-i. The value function $V(x_i)$ and the benefit function $B(x_i)$ can be optimized by the demand prediction module 426 to precisely and accurately predict the demand.

The AoD provider 140 may communicate the predicted/optimized unit price (P(predicted)) to the each one of the tenants 301-i, for example, through the tenant portal 412. The AoD provider 140 and the tenants 301-i may negotiate and enter agreements on the resource allocation. In some embodiments, if the actual demand provided by the tenants 301-i deviates from the optimized demand obtained by the S/D model of the AoD provider 140, the AoD provider 140 may modify the S/D model accordingly, taking in to account the difference between the optimized demand and the actual demand, and obtain an refined unit price based on the modified S/D model. Once the refined unit price and the actual demand from each tenant are ascertained, each one of the network managers 303-i corresponding to the tenant 301-i may establish and/or adjust QoS requirements and network performance requirements based on the actual demand. The network managers 303-i may further communicate the adjusted QoS requirements and network performance requirements to the AoD provider 140.

The resource allocation module 430 is responsible for allocating resources to the tenants and designate portions of a resource sharable among the tenants. In some embodiments, the resource allocation module 430 may generate a resource allocation profile that records the allocation of resource to each one of the tenants 301-i. In some embodiments, the resource allocation module 430 may assign bands to the tenants, allocate BWPs of each band to the tenants, specify bandwidth of each BWP, designate a total bandwidth to each tenant, specify timeframes (or time slots) for each allocation.

In some embodiments, the analytics device 404 may operate to determine resource allocation for each one of multiple time slots. A time slot used herein is a fixed or variable-length interval of time within a scheduling or resource allocation framework. Time slots are often used to divide time into manageable segments to allocate resources, schedule events, or facilitate coordination. For example, a time slot may be a specified period of time during a day (e.g., daytime, evening, midnight, peak load period, etc.) A time slot may also be based on weeks, months, or seasons. Time slots can represent discrete time intervals during which specific resources, such as bandwidth or processing capacity, are allocated to different tasks, users, or applications. The allocation of resources by be dynamic over multiple time slots. The unit price of resources may also be dynamic over multiple time slots and/or different from time slot to time slot.

In some embodiments, the analytics device 404 may define and partition a time period (e.g., a day, a week, a month, a season, a year, etc.) into discrete time slots, each with a specific duration. These time slots are used as scheduling units for resource allocation. For each time slot, the analytics device 404 may predict the resource demands from various tenants, which may involve analyzing historical usage patterns, traffic forecasts, and tenant-specific requirements as described above. The analytics device 404 may assess the available network resources for each one of the time slots by considering the total bandwidth, processing power, or any other resource that can be allocated. The analytics device 404 may predict demand of resources from tenants for each specific time slot, construct different S/D models respectively for different time slots, and obtain predicted/optimized unit price for the AoD provider and predicted/optimized demand for each tenant with respect to each time slot. The S/D models may be tailored to the resource dynamics expected during that particular time slot and reflect how changes in resource supply and demand will impact the unit price. For example, during peak hours when resource demand is high, the unit price may be set at a premium. Conversely, during off-peak hours, the unit price could be lowered to incentivize resource usage. The exact optimized unit price for each time slot may be obtained in good accuracy. In tandem with the predicted/optimized unit price, the analytics device 404 calculates the predicted/optimized demand for each tenant during the specified time slot. The predicted/optimized demand represents the amount of resources allocated to each tenant at the predicted/optimized unit price for the specific time slot. By setting different unit prices for various time slots, the AoD provider can implement a dynamic pricing strategy, which may encourage resource usage when it aligns with available capacity while discouraging excessive use during peak times.

The profile generation device 408 is responsible for generating a tenant profile. The tenant profile may include tenant information, resources allocated to the tenant at each time slot, QoS attributes, QoS requirements, network performance requirements, among others.

The AoD provisioning device 406 is responsible for providing access to the allocated resources respectively to the tenants 301-*i* to allow a UE connected to a tenant network 304-*i* to use the resource allocated to the corresponding tenant of the tenant network 304-*i*. The AoD provisioning device 406 may further include, among other components, a muxer 302, a scheduler 420, and a traffic management module 422. As described above with references to FIG. 3B, the muxer 302 may merge various data streams or traffic from different sources to allow multiple tenants to share the same resource, such as a band. For example, the muxer 302 can receive data packets from each tenant network 304-*i*, examine characteristics of the packets (e.g., source, destination, and bandwidth requirements), and combine the packets into a single data stream for transmission over the shared network infrastructure. the muxer 302 may be operable to dynamically allocate more or less bandwidth to the packets from a tenant network 304-*i*, depending on the current usage, status of QoS satisfaction, as well as currently network performance of the tenant network 304-*i*. The muxer 302 may continuously assess the QoS levels and network performance for each tenant 301-*i*.

If any tenant's QoS requirements are at risk of not being met due to high demand or network congestion, the muxer 302 may take corrective actions, such as reallocating bandwidth or applying predetermined QoS policies to ensure the desired service quality.

The scheduler 420 is responsible for executing the resource allocation profile for providing AoD and performing any real-time adjustments (e.g., fine-tuning the allocation) based on demand and real-time network conditions. In some embodiments, the scheduler 420 starts by referencing the resource allocation profile, which specifies how network resources (such as bandwidth, processing power, or storage) are allocated to each tenant during different time slots. Based on the resource allocation profile, the scheduler 420 executes resource allocation to each tenant. While the resource allocation profile may provide a baseline for resource distribution, the scheduler 420 may constantly monitor real-time demand and network conditions. For example, the scheduler 420 may continually assess the resource demands of each tenant in real-time (e.g., from AoD requests sent from the tenants) and monitor the performance of the tenant network 304-*i*, including latency, packet loss, and overall throughput. When the scheduler 420 detects imbalances in resource demand or declining network performance, it may initiate fine-tuning adjustments. For example, the scheduler 420 can dynamically allocate more or less bandwidth to each tenant, ensuring that tenants with higher demand receive the necessary resources without compromising others. The scheduler 420 can give higher priority to certain tenants or applications during peak demand periods based on tenant priorities.

The traffic management module 422 is responsible for managing the traffic and load balancing during AoD provisioning. The traffic management module 422 may continuously monitor the tenant network's traffic load, redistribute incoming network traffic across available resources (servers, data centers, or network paths) to prevent overutilization of specific resources and ensure relatively even resource distribution and optimize network performance and prevents resource bottlenecks. In some embodiments, the traffic management module 422 can classify and prioritize traffic based on predefined policies or QoS attributes of the tenant. For example, real-time video streaming may be given higher priority over non-essential data transfers. The traffic management module 422 may further manage traffic within a particular tenant network 304-*i*, for example, by classifying and prioritizing traffic according to predetermined user class priorities within the particular tenant network 304-*i*.

The database 410 is responsible for storing, managing, and organizing various types of data, information, and profiles received in and generated by the AoD provider 140, including but not limited to tenant information, historical tenant data, tenant profiles. S/D models, SLAs, resource allocation profile, billing and accounting data, network performance data, resource inventory, resource usage data, and so on.

FIG. 5 is a chart illustrating an example resource allocation profile 500 for AoD provisioning in accordance with various embodiments. In the illustrated example, the resource allocation profile 500 includes various data for each one of a plurality of tenants (i.e., Enterprises 1, 2, 3, . . . ), including tenant identity data 502, geographic area data 504, band assignment data 506, bandwidth allocation data 508, total bandwidth data 510, QoS requirements (or expected QoS performance) 512. For example, the band assignment data 506 shows that Band 1 is assigned to Enterprises 1, 2, and 3 and are sharable among Enterprises 1, 2, and 3. The Bandwidth allocation data 508 shows that a first portion of Band 1 (i.e, BWP1-1) is allocated to Enterprise 1, a second portion of Band 1 (i.e., BWP1-2) is allocated to Enterprise 2, and a third portion of Band 1 (i.e., BWP1-3) is allocated to Enterprise 3. Similarly, BWP2-1 of Band 2 is assigned to Enterprise 1, and BWP2-2 of Band 2 is assigned to Enterprise 2. BWP 3-1 of Band 3 is assigned to Enterprise 2. The total bandwidth data 510 shows the sum of the BWPs assigned to each one of Enterprises 1, 2, and 3. The QoS requirements shows various QoS attributes that the resource allocation profile aims at. For example, Enterprise 1 has a device type of mobile device, requires maximum throughput of 1 Mbps, latency of less than 50 milliseconds, normal outdoor coverage with high reliability, and normal handover priority. The QoS requirements for Enterprises 1, 2, and 3 are different. In some embodiments, the resource allocation profile 500 corresponds to a specific time slot, and a series of similar resource allocation profiles 500 may be generated for a series of time slots, and the resource allocation specified in each one of the resource allocation profiles 500 may be different.

Figure 6A:
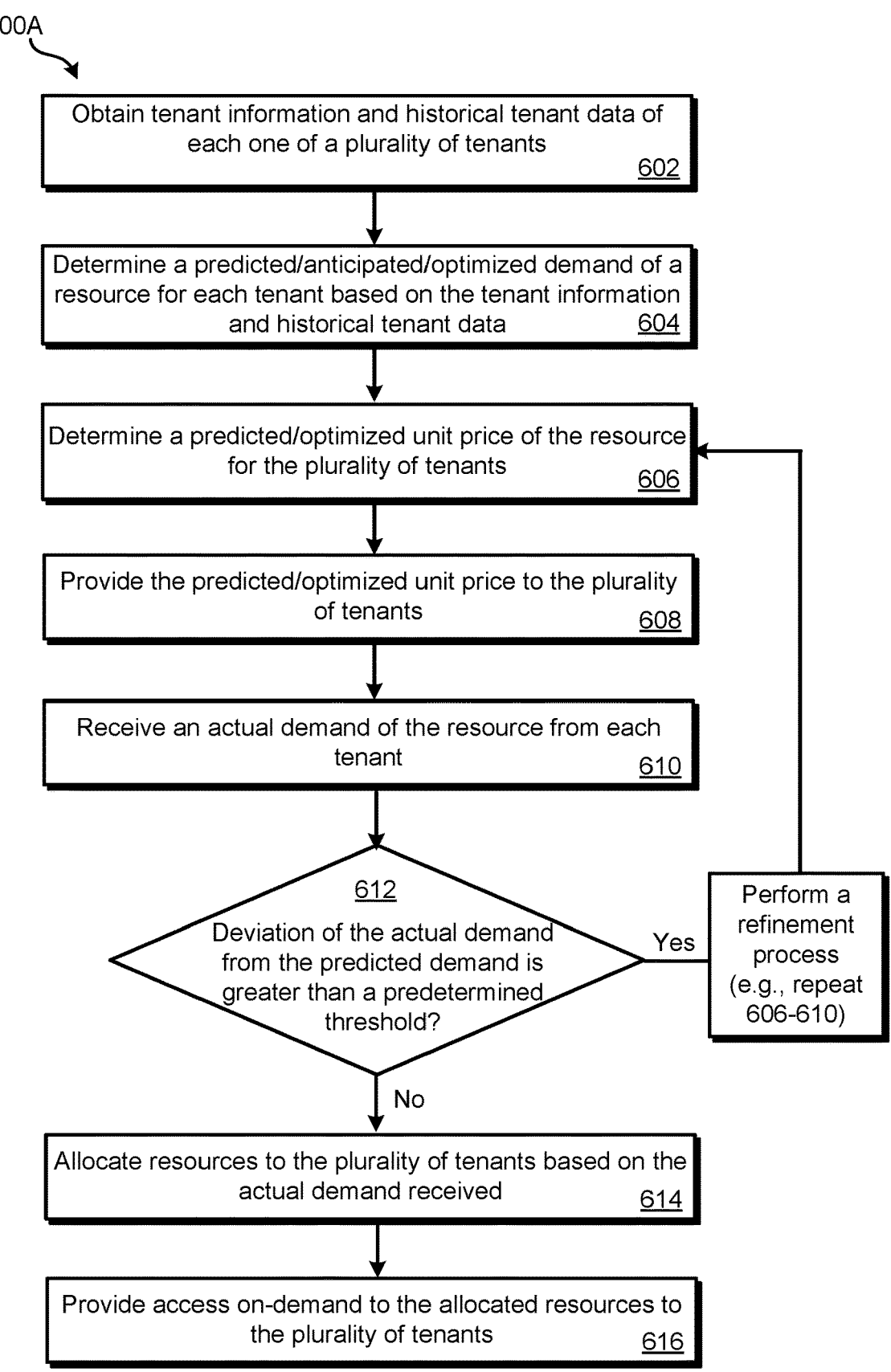
FIG. 6A is a flow diagram illustrating an example method for AoD provisioning, according to various embodiments.

FIG. 6A is a flow diagram illustrating an example method 600A of AoD provisioning according to various embodiments. The method 600A may be implemented by one or more components included in the systems described herein, such as the system 100, 300A, 300B, and 400. Depending on the implementation, the method 600A may include additional, fewer, or alternative steps performed in various orders or in parallel.

At 602, tenant information and historical tenant data of each one of a plurality of tenants are obtained, by the AoD provider. As described above, the tenant information and historical tenant data may include various data points such as tenant identity and registration status, service type data, device quantity data, device type data, application type data, coverage area data, location proximity data, various QoS attributes of the tenants such as signal strength data, signal-to-noise (S/N) ratio data, reliability data, maximum throughput (peak load data transmission rate) data, latency data, historical bandwidth usage data.

At 604, a predicted/optimized demand of resource for each tenant is obtained or determined based on the tenant information and historical tenant data. In some embodiments, a supply-and-demand (S/D) model is constructed. The S/D model is represented by a total value for each tenant as a function of the demand for a resource and a unit price of the resource, as well as a total income for the AoD provider as a function of the unit price of the resources and the total demand of the resources by all tenants. In some embodiments, the total value for each tenant is further represented by a difference between the benefit derived from the demand and the cost of that demand for each tenant. In some embodiments, the S/D model may be based on a game theory and constructed based on at least the equations (1)-(4) described above.

In some embodiments, an optimization process based on the S/D model is performed to determine a predicted/optimized demand for each tenant. In one example, the predicted/optimized demand is obtained by respectively maximizing the total value of each tenant (or causing the total value of each tenant to exceed a predetermined value threshold based on the S/D model), subject to a condition that the total demand of the resource from all of the tenants is not greater than a predetermined demand quantity.

In some embodiments, an equilibrium status is identified/determined. In some embodiments, a Nash Equilibrium Status (NES) is identified by optimization using the S/D model based on a game theory, where at the NES, the total value of each tenant is maximized (or is equal to or exceeds a predetermined value threshold), the total income to be obtained by the AoD provider is maximized (or is equal to or exceed a predetermined income threshold), no tenant has incentive to further change the demand, and the AoD provider has no incentive to further change the price.

At 606, a predicted/optimized unit price of the resource is obtained, the predicted/optimized unit price being common to all tenants. The predicted/optimized unit price of the resource and the predicted/optimized demand of each tenant may be obtained simultaneously in the optimization process and/or at the NES identified in the optimization process.

At 608, the unit price is provided to each one of the plurality of tenants. In some embodiments, the unit price is communicated from the AoD provider to the network manager of each tenant. At 610, an actual demand of the resource is provided by each tenant and received by the AoD provider. The actual demand may be substantially the same as the predicted/optimized demand or deviate from the predicted/optimized demand.

At 610, a determination is made on whether the deviation of the actual demand from the predicted/optimized demand exceeds a predetermined threshold (e.g., 5%, 10%, or 25% of the predicted/optimized demand). In some embodiments, the determination is made on whether a deviation of a total actual demand from a total of the predicted/optimized demands of all the tenants exceeds a predetermined threshold (e.g., 5%, 10%, or 25% of the total predicted/optimized demand). In some embodiments, the determination is made on whether a deviation of a total income based on a total actual demand of the tenants from a total income based on a total predicted/optimized demand of the tenants exceeds a predetermined threshold (e.g., 5%, 10%, or 25% of the total predicted/optimized demand). If the deviation exceeds the predetermined threshold, a refinement process is performed, for example, by repeating steps 606, 608, 610, and 612. For example, a refined unit price is determined using the S/D model based on the most recent actual demand provided by each one of the tenants. The refined unit price is provided and communicated to the tenants, and an updated actual demand from each tenant is received. A determination is then made on whether a deviation of a total of updated actual demand from a total of the actual demand exceeds the predetermined threshold. The refinement process may be continued until a total of the actual demand matches a total of the predicted/optimized demands of the tenants (i.e., the deviation is no greater than the predetermined threshold), or until a total income based on the total of the actual demand matches a total income based on the total of the predicted/optimized demand of the tenants (i.e., the deviation is no greater than the predetermined threshold).

At 614, if the deviation of the actual demand from the predicted/optimized demand is of or below the predetermined threshold, the resource is allocated to the plurality of tenants based on the actual demand from each tenant. In some embodiments, a resource allocation profile is generated to specify the resources allocated to each tenant. In some embodiments, multiple resource allocation profiles are generated, each corresponding to a specific time slot and specifying the resource allocated to each tenant within the specific time slot.

At 616, access on-demand to the allocated resources is provided to one of the plurality of tenants. In some embodiments, the resource allocation is executed based on the resource allocation profile, and the resource is allocated to one of the tenants for a UE connected to the corresponding tenant network of the tenant to use.

FIG. 6B is a flow diagram illustrating another example method 600B for resource allocation. Depending on the implementation, the method 600B may include additional, fewer, or alternative steps performed in various orders or in parallel. The method 600B or any steps included therein may be combined with other methods or steps described in this disclosure.

At 650, an S/D model is constructed. The S/D model is used by an AoD provider to optimize allocation of bandwidth of a radio frequency spectrum or a band thereof associated with a radio unit sharable by a plurality of tenants for providing access on-demand to the spectrum or band to the plurality of tenants. In some embodiments, The S/D model is represented by a total value for each tenant as a function of the demand for bandwidth and a unit price of bandwidth, as well as a total income for the AoD provider as a function of the unit price of bandwidth and the total demand of bandwidth by all the plurality of tenants. In some embodiments, the total value for each tenant is further represented by a difference between the benefit derived from the demand of bandwidth and the cost of that demand for each tenant. In some embodiments, the S/D model may be based on a game theory and constructed based on at least the equations (1)-(12) described above.

At 652, an optimization process is performed to identify an NES based on the S/D model, wherein at the NES, the total value of each tenant is maximized (or is equal to or exceeds a predetermined value threshold), the total income of the AoD provider is maximized (or is equal to or exceeds a predetermined income threshold), no tenant has an incentive to unilaterally change their demand of bandwidth (i.e., the predicted/optimized demand) given the unit price (i.e., the predicted/optimized unit price) set by the AoD provider, and the AoD provider has no incentive to change the unit price of bandwidth given the bandwidth demands of tenants.

At 654, a predicted/optimized unit price of bandwidth and a predicted/optimized demand of bandwidth for each one of the plurality of tenants are obtained at the NES. The predicted/optimized price of bandwidth may be common to all tenants. The predicted/optimized price of bandwidth may be a unit price per MHz. The predicted/optimized demand of bandwidth for each tenant allows the tenant to maximize the total value from the predicted/optimized demand of bandwidth or to cause the total value to exceed a predetermined value threshold.

At 656, the bandwidth is allocated to the plurality of tenants according to the predicted/optimized demand of bandwidth from each tenant. At 658, a request for access to bandwidth from one of the plurality of tenants is received by the AoD provider. At 660, access to the allocated bandwidth is provided to the requesting tenant.

FIG. 6C is a flow diagram illustrating another example method 600C for resource allocation. Depending on the implementation, the method 600C may include additional, fewer, or alternative steps performed in various orders or in parallel. The method 600C or any steps included therein may be combined with other methods or steps described in this disclosure. Operations included in method 600C that are similar to the operations of methods 600B and 600C will not be repeated unless otherwise indicated.

At 680, a time period is partitioned into a plurality of unit time slots for the purpose of demand prediction and dynamic resource allocation. For example, a day can be partitioned into 24 hours, each hour is a unit time slot. The plurality of unit time slots can include, for example, a first time slot and a second time slot. In some embodiments, the first and second time slots are consecutive (e.g., the first time slot is the initial time slot, and the second time slot is the subsequent time slot). At 682, tenant information and historical tenant data of each one of the plurality of tenants is obtained. At 684, a predicted/optimized demand of a resource of a cellular network for each one of the plurality of tenants within each one of the time slots. In some embodiments, a first predicted/optimized demand is predicted for the first time slot, and a second predicted/optimized demand is predicted for the second time slot. In some embodiments, the first predicted/optimized demand and the second predicted/optimized demand may be different in value.

At 686, a predicted/optimized unit price of the resource is determined for each one of the plurality of time slots. In some embodiments, a first predicted/optimized unit price is determined for the first time slot, and a second predicted/optimized unit price is determined for the second time slot. In some embodiments, the first predicted/optimized unit price and the second predicted/optimized unit price are different in value. In some embodiments, a uniform unit price (or averaged unit price) is determined for a tenant that requests the resources for multiple time slots. For example, if the first tenant requests resources for both the initial time slot (i.e., the first time slot) and the subsequent time slot (i.e., the second time slot), the uniform unit price can be calculated based on the first tenant's first demand and the corresponding first predicted/optimized price for the first time slot, as well as their second demand and the corresponding second predicted/optimized price for the second time slot. The adoption of a uniform unit price may offer operational convenience for both the AoD provider and the tenant.

At 688, the predicted/optimized unit price for each time slot is communicated to each one of the plurality of tenants. At 690, an actual demand of the resource within each time slot from each one of the plurality of tenants is received. In some embodiments, a first actual demand and a second actual demand are respectively determined for the first and second time slots. At 692, a determination is made on whether a deviation of the actual demand from the predicted/optimized demand is of or below a predetermined threshold. In some embodiments, a first deviation of the first actual demand from the first predicted/optimized demand for the first time slot is made, and a second deviation of the second actual demand from the second predicted/optimized demand for the second time slot is made.

At 694, in response to the determination that the deviation of the actual demand from the predicted/optimized demand is of or below a predetermined threshold, the resource is allocated to the plurality of tenants within each time slot, based on the actual demand received from each one of the plurality of tenants. In some embodiments, in response to the determination that the deviation of the actual demand from the predicted/optimized demand is above the predetermined threshold, a refinement process is performed, for example, by repeating the operations 684-690 to refine the predicted/optimized demand, the predicted/optimized unit price for each time slot, as well as the uniform unit price for consecutive time slots.

Figure 7:
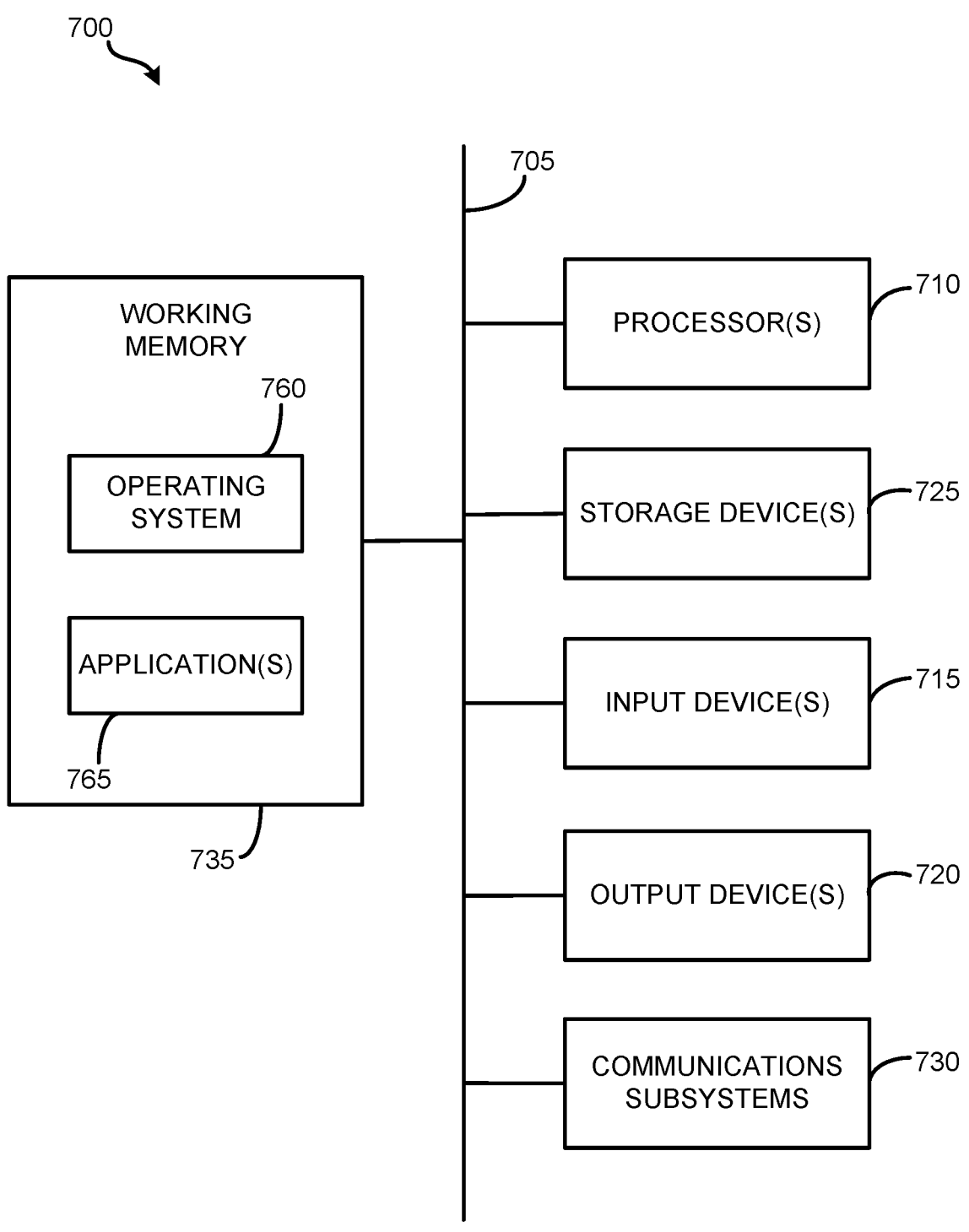
FIG. 7 is a schematic diagram illustrating an example computer system or computer device, according to various embodiments.

The communications systems 100, 300A, 300B, 400, and any components included therein as described above may include a computer system that further includes computer hardware and software that form special-purpose network circuitry to implement various embodiments such as communication, model construction, optimization, calculation, determination, and so on. FIG. 7 is a schematic diagram illustrating an example of computer system 700. The computer system 700 is a simplified computer system that can be used to implement various embodiments described and illustrated herein. A computer system 700 as illustrated in FIG. 7 may be incorporated into devices such as a portable electronic device, mobile phone, server grade machines, or other device as described herein. FIG. 7 provides a schematic illustration of one embodiment of a computer system 700 that can perform some or all of the steps of the methods and workflows provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown including hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include without limitation a mouse, a keyboard, a camera, and/or the like; and one or more output devices 720, which can include without limitation a display device, a printer, and/or the like.

The computer system 700 may further include and/or be in communication with one or more non-transitory storage devices 725, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 730 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 730. In other embodiments, a portable electronic device, e.g., the first electronic device, may be incorporated into the computer system 700, e.g., an electronic device as an input device 715. In some embodiments, the computer system 700 will further include a working memory 735, which can include a RAM or ROM device, as described above.

The computer system 700 also can include software elements, shown as being currently located within the working memory 735, including an operating system 760, device drivers, executable libraries, and/or other code, such as one or more application programs 765, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 7, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the operations of such methods are performed by the computer system 700 in response to processor 710 executing one or more sequences of one or more instructions, which might be incorporated into the operating system 760 and/or other code, such as an application program 765, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, solid state drive, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a device" includes a plurality of such devices, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

What is claimed is:

1. A method, comprising:
obtaining, by an access on-demand (AoD) provider, tenant information and historical tenant data of each one of a plurality of tenants in connection with the AoD provider;
determining, by the AoD provider, an anticipated demand of a resource of a cellular network for each one of the plurality of tenants, based on the tenant information and the historical tenant data;
determining, by the AoD provider, a unit price of the resource, the unit price being in a range optimized based on the anticipated demand from each one of the plurality of tenants;
providing, by the AoD provider, the unit price to each one of the plurality of tenants;
receiving, by the AoD provider, an actual demand of the resource from each one of the plurality of tenants;
determining, by the AoD provider, that a deviation of the actual demand from the anticipated demand determined by the AoD provider is of or below a predetermined threshold;
in response to the determination, allocating, by the AoD provider, the resource to the plurality of tenants, based on the actual demand received from each one of the plurality of tenants; and
providing access to the allocated resource, by the AoD provider, to one of the plurality of tenants for one or more user equipment (UE) connected to a tenant network of the tenant to use the allocated resource.

2. The method of claim 1, wherein:
the resource of the cellular network is a radio frequency spectrum or a band thereof generated from one or more radio units (RUs) of the cellular network;
the anticipated demand is an anticipated bandwidth the spectrum or the band;
the unit price is a price per unit bandwidth of the spectrum or band; and the actual demand is an actual bandwidth of the spectrum or the band.

3. The method of claim 1, further comprising:

constructing a supply-and-demand (S/D) model, the S/D model represented by:

a total value for each tenant as a function of a demand variable for the resource and a unit price variable of the resource; and a total income for the AoD provider as a function of the unit price variable of the resource and a total demand variable of the resource from all the plurality of tenants; and performing an optimization process using the S/D model to identify an equilibrium status, wherein at the equilibrium status, the total value of each tenant is of or above a predetermined value threshold, and the total income of the AoD provider is of or above a predetermined income threshold, wherein the anticipated demand of each tenant and the range for the unit price are obtained at the NES.

4. The method of claim 3, wherein, the plurality of tenants comprise N tenants, each one of the N tenants denoted as tenant i, wherein i is an integer selected from 1 to N, and N represents a total number of the tenants and is an integer greater than 1;

the total value for the tenant i is represented by:

$$V(x_i) = B(x_i) - P * x_i$$

wherein $x_i$ is the demand variable, $V(x_i)$ is the total value, $B(x_i)$ is a total benefit function representing the total benefit obtained by tenant i, P is the unit price variable for all the tenants; and the total income for the AoD provider is represented by:

$$I = P * W = P * \sum_{i=1}^{N} x_i$$

wherein I is the total income, and W is the total demand variable.

5. The method of claim 4, wherein, $B(x_i)$ is further represented by $A_i * \log(x_i+1)$, wherein $A_i$ is a known or ascertainable factor for tenant i;

the total value for tenant i is represented by:

$$V(x_i) = A_i * \log(x_i + 1) - P * x_i$$

wherein the anticipated demand is denoted as $x_i$(anticipated) and represented by:

$$x_i(\text{anticipated}) = \frac{A_i}{P} - 1$$

wherein the unit price is denoted as P(predicted) and represented by:

$$P(\text{predicted}) = \frac{\sum_{i=1}^{N} A_i}{W + N}.$$

6. The method of claim 1, further comprising:

in response to the determination that the deviation exceeds the predetermined threshold, performing, by the AoD provider, a refinement process, wherein performing the refinement process further comprises:

obtaining a refined unit price based on the actual demand provided by each tenant;

providing the refined unit price to each tenant; and receiving an updated actual demand from each tenant.

7. The method of claim 6, further comprising:

determining whether a deviation of the updated actual demand from the actual demand exceeds the predetermined threshold.

8. The method of claim 1, further comprising:

determining Quality of Service (QoS) attributes for each one of the plurality of tenants, based on the actual demand provided by the corresponding tenant.

9. The method of claim 1, wherein, the tenant information of each tenant further comprises tenant identity data, tenant registration status data, service type data, device quantity data, device type data, application type data, coverage area data, location data, QoS attributes data.

10. The method of claim 1, further comprising:

generating a resource allocation profile that records the actual demand of resource for each one of the plurality of tenants.

11. An AoD provisioning system in wireless communication with a plurality of tenant networks respectively operated by a corresponding plurality of tenants, the AoD provisioning system comprising:

one or more processors; and a computer-readable storage media storing computer-executable instructions that, when executed by the one or more processors, cause the AoD provisioning system to:

obtain tenant information and historical tenant data of each one of the plurality of tenants;

determine an anticipated demand of a resource of a cellular network for each one of the plurality of tenants, based on the tenant information and the historical tenant data;

determine a unit price of the resource, the unit price being in a range optimized based on the anticipated demand from each one of the plurality of tenants;

provide the unit price to each one of the plurality of tenants;

receive an actual demand of the resource from each one of the plurality of tenants;

determine that a deviation of the actual demand from the anticipated demand is of or below a predetermined threshold;

in response to the determination, allocate the resource to the plurality of tenants, based on the actual demand received from each one of the plurality of tenants; and providing access to the allocated resource to one of the plurality of tenants for one or more UE connected to the tenant network corresponding to the tenant to use the allocated resource.

12. The AoD provisioning system of claim 11, wherein:

the resource of the cellular network is a radio frequency spectrum or a band thereof generated from one or more Rus of the cellular network;

the anticipated demand is an anticipated bandwidth the spectrum or the band;

the unit price is a price per unit bandwidth of the spectrum or band; and the actual demand is an actual bandwidth of the spectrum or the band.

13. The AoD provisioning system of claim 11, wherein the instructions when executed by the one or more processors further cause the AoD provisioning system to:

construct an S/D model, the S/D model represented by:

a total value for each tenant as a function of a demand variable for the resource and a unit price variable of the resource; and a total income for the AoD provisioning system as a function of the unit price variable of the resource and a total demand variable of the resource from all the plurality of tenants; and perform an optimization process using the S/D model to identify an equilibrium status, wherein at the equilibrium status, the total value of each tenant is of or above a predetermined value threshold, and the total income of the AoD provisioning system is of or above a predetermined income threshold, wherein the anticipated demand of each tenant and the range for the unit price are obtained at the NES.

14. The AoD provisioning system of claim 13, wherein, the plurality of tenants comprises N tenants, each one of the N tenants denoted as tenant i, wherein i is an integer selected from 1 to N, and N represents a total number of the tenants and is an integer greater than 1;

the total value for the tenant i is represented by:

$$V(x_i) = B(x_i) - P * x_i$$

wherein $x_i$ is the demand variable, $V(x_i)$ is the total value, $B(x_i)$ is a total benefit function representing the total benefit obtained by tenant i, P is the unit price variable for all the tenants; and the total income for the AoD provisioning system is represented by:

$$I = P * W = P * \sum_{i=1}^{N} x_i$$

wherein I is the total income, and W is the total demand variable.

15. The AoD provisioning system of claim 14, wherein, $B(x_i)$ is further represented by $A_i*\log(x_i+1)$, wherein $A_i$ is a known or ascertainable factor for tenant i;

the total value for tenant i is represented by:

$$V(x_i) = A_i * \log(x_i + 1) - P - x_i$$

wherein the anticipated demand denoted as $x_i$(anticipated) is represented by:

$$x_i(\text{anticipated}) = \frac{A_i}{P} - 1$$

wherein the unit price is denoted as P(predicted) and represented by:

$$P(\text{predicted}) = \frac{\sum_{i=1}^{N} A_i}{W + N}.$$

16. The AoD provisioning system of claim 11, wherein the instructions when executed by the one or more processors further cause the AoD provisioning system to:

in response to the determination that the deviation exceeds the predetermined threshold, perform a refinement process comprising:

obtaining a refined unit price based on the actual demand provided by each tenant;

providing the refined unit price to each tenant;

receiving an updated actual demand from each tenant; and determine whether a deviation of the updated actual demand from the actual demand exceeds the predetermined threshold.

17. The AoD provisioning system of claim 11, wherein the instructions when executed by the one or more processors further cause the AoD provisioning system to:

determining QoS attributes for each one of the plurality of tenants, based on the actual demand provided by the corresponding tenant.

18. The AoD provisioning system of claim 11, wherein the instructions when executed by the one or more processors further cause the AoD provisioning system to:

generating a resource allocation profile that records the actual demand of resource for each one of the plurality of tenants.

19. A system comprising:

an AoD provider; and a plurality of tenant networks in wireless communication with the AoD provider, the plurality of tenant networks respectively operated by a corresponding plurality of tenants, wherein the AoD provider is configured to:

obtain tenant information and historical tenant data of each one of the plurality of tenants;

select a first time slot and a second time slot from a plurality of time slots;

determine a first anticipated demand for a resource of a cellular network within the first time slot and a second anticipated demand of the resource within the second time slot, respectively for each one of the plurality of tenants;

determine a first unit price of the resource for the first time slot and a second unit price of the resource for the second time slot;

receive a first actual demand of the resource within the first time slot and a second actual demand within the second time slot from the one of the plurality of tenants;

determine that a first deviation of the first actual demand from the first anticipated demand and a second deviation of the second actual demand from the second anticipated demand are of or below a predetermined threshold;

in response to the determination, allocate the resource to the plurality of tenants within the first and second time slots, based on the actual demand received from the plurality of tenants; and provide access to the allocated resource to the plurality of tenants within the first and second time slots.

20. The system of claim 19, wherein the AoD provider is further configured to:

identify a first tenant of the plurality of tenants, the first tenant requesting access to the resource in both the first and second time slots, and the first and second time slots being consecutive;

determine a uniform unit price for the first tenant, based on the first unit price and the second unit price as well as the first anticipated demand and the second anticipated demand by the first tenant; and communicate the uniform unit price for the first and second time slots to the first tenant.

\* \* \* \* \*